United States Patent [19]
Raimann

[11] Patent Number: 5,572,004
[45] Date of Patent: Nov. 5, 1996

[54] METHOD FOR PAYING FOR SERVICES AND/OR GOODS AND APPARATUS FOR CARRYING OUT THE METHOD

[75] Inventor: Gerhard Raimann, Alland, Austria

[73] Assignee: Landis & Gyr Business Support AG, Zug, Switzerland

[21] Appl. No.: 431,911

[22] Filed: Apr. 28, 1995

Related U.S. Application Data

[63] Continuation of Ser. No. 159,854, Nov. 30, 1993, abandoned.

[30] Foreign Application Priority Data

Dec. 1, 1992 [CH] Switzerland ............ 03678/92

[51] Int. Cl.$^6$ ........................................ G06K 5/00
[52] U.S. Cl. .................... 235/380; 235/381; 235/384; 194/205
[58] Field of Search .......................... 235/380, 381, 235/384; 194/205

[56] References Cited

U.S. PATENT DOCUMENTS

| | | | |
|---|---|---|---|
| 3,653,480 | 4/1972 | Yamamoto et al. | 194/4 |
| 4,322,613 | 3/1982 | Oldenkamp | 235/449 |
| 4,544,834 | 10/1985 | Newport et al. | 235/487 X |
| 4,711,993 | 12/1987 | Kosednar et al. | 235/380 |
| 4,859,837 | 8/1989 | Halpern | 235/380 |
| 4,870,260 | 9/1989 | Niepolomski et al. | 235/437 X |
| 4,992,646 | 2/1991 | Collin | 235/380 X |
| 5,097,115 | 3/1992 | Ogasawara et al. | 235/380 O |
| 5,168,151 | 12/1992 | Nara | 235/492 X |
| 5,317,137 | 5/1994 | Wilkins | 235/380 |

FOREIGN PATENT DOCUMENTS

| | | |
|---|---|---|
| 0185365 | 6/1986 | European Pat. Off. . |
| 0257596 | 3/1988 | European Pat. Off. . |
| 0363122 | 4/1990 | European Pat. Off. . |
| 0429176 | 5/1991 | European Pat. Off. . |
| 2339215 | 8/1977 | France . |
| 1951093 | 3/1970 | Germany . |
| 4103415 | 3/1992 | Germany . |
| 467492 | 2/1969 | Switzerland . |
| 9116691 | 10/1991 | WIPO . |

OTHER PUBLICATIONS

Article: "Security Without Identification: Transaction Systems To Make Big Brother Obsolete", by David Chaum, Communications of the ACM, Oct., 1985, vol. 28, No. 10, pp. 1030–1044.
"Transaktionen in Datenbanksystemen", CIP-Titelaufnahme der Deutschen Bibliothek, by Gerhard Weikum, 1988, Addison–Wesley, Verlag, pp. 4, 10, 15, 16.

Primary Examiner—Donald T. Hajec
Assistant Examiner—Michael G. Lee
Attorney, Agent, or Firm—Meltzer, Lippe, Goldstein et al.

[57] ABSTRACT

In a method for payment for services and/or goods, an apparatus with a data terminal device for reading and changing an amount value in a credit balance carrier and a security module provided with a first memory area and a second memory area is used, which is connected to the data terminal device via a communications channel. In a first transaction a usable amount is transferred from the credit balance carrier to the first memory area. During the purchase of the service and/or goods, a running cost amount for the service and/or goods, in a second transaction an unused amount is transferred from the first memory area to the credit balance carrier. In a third transaction the difference between the usable amount and the unused amount is transferred from the first memory area to the second memory area. The apparatus is provided with an inhibiting and/or enabling mechanism which only permits transactions to the credit balance carrier from the first memory area and thus, does not permit transactions to the credit balance carrier from the second memory area.

9 Claims, 2 Drawing Sheets

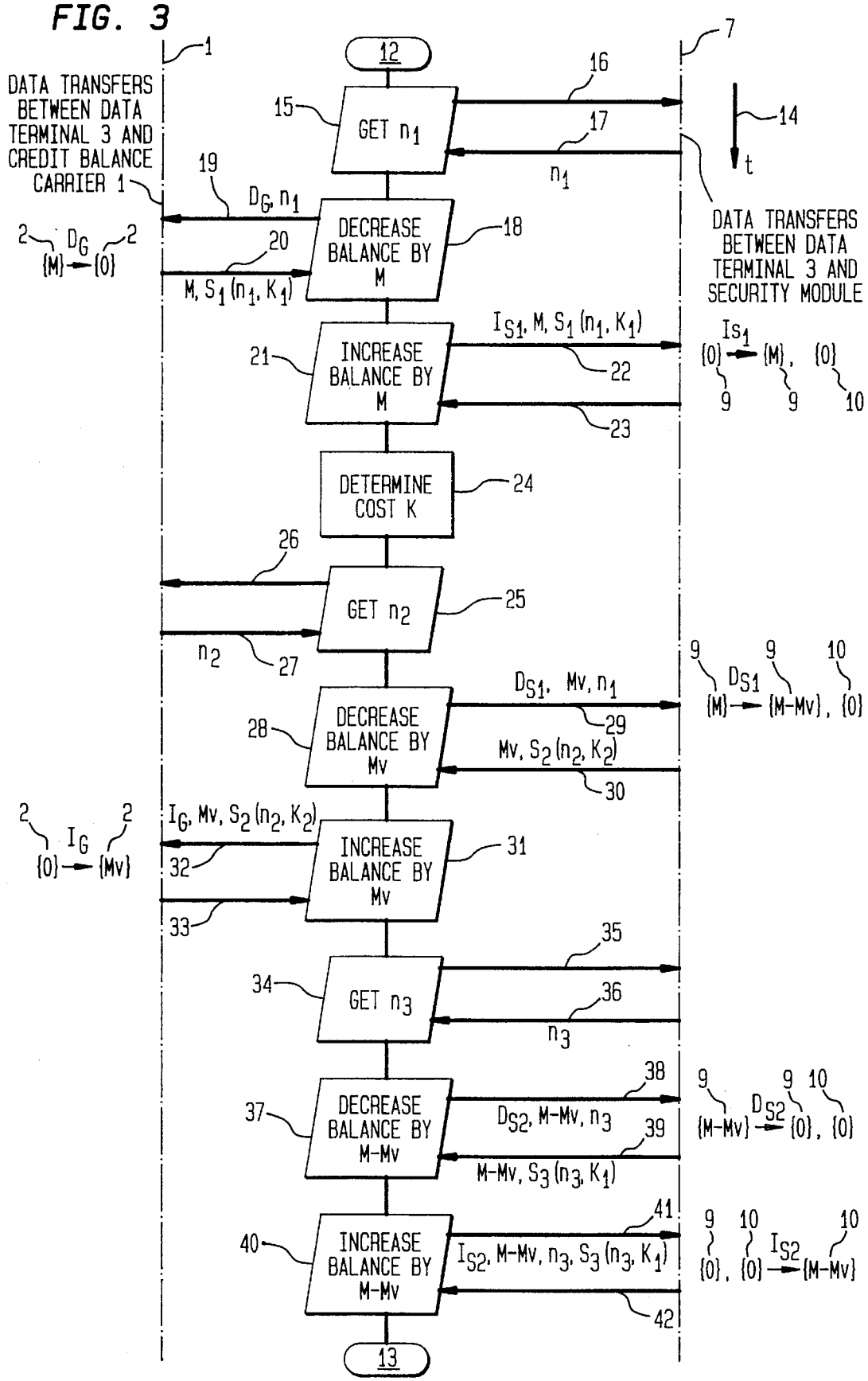

METHOD FOR PAYING FOR SERVICES AND/OR GOODS AND APPARATUS FOR CARRYING OUT THE METHOD

This is a continuation, of application Ser. No. 08/159,854, filed Nov. 30, 1993, now abandoned.

BACKGROUND OF THE INVENTION

1. Field of the Invention

The invention relates to a method for paying for services and/or goods and to an apparatus for carrying out the method.

Such methods are advantageously used for cash-less payment for those types of services and/or goods—for example when telephoning or filling up with fuel—the price of which is not fixed beforehand.

2. Description of the Prior Art

A prior method for payment for services and/goods is known comprising steps of, prior to a purchase of a service and/or goods, reading a usable amount from a credit balance means (credit balance carrier) and writing said useable amount into a memory; and, during said purchase, determining a running cost amount for said service and/or goods and storing back into said credit balance means an unused amount, wherein said unused amount is said difference between said usable amount and said cost amount. A method of this type is described in the preamble of claim 1 is known (EP 0 185 365 B1) in which an amount is written into a memory in a pre-paid credit balance card and reduced in the memory during performance of a service. When the performance of the service is completed, the reduced amount is written back into the credit balance card, whereby the performance of the service is paid for.

Without special measures it is not guaranteed that a service/goods purchased are actually paid for by a reduction in the credit balance on the credit balance card and that no credit balance greater than the credit balance less the value of the service/goods is written back into the memory of the credit balance card.

SUMMARY OF THE INVENTION

An object of the invention is to provide a method for reliable payment for services and/or goods and an apparatus with which the method can be carried out.

In accordance with a first aspect of the invention, there is provided
a method for payment for services and/goods of a type comprising steps of:
prior to a purchase of a service and/or goods:
reading a usable amount from a credit balance means (credit balance carrier); and
writing said useable amount into a memory; and
during said purchase:
determining a running cost amount for said service and/or goods; and
storing back into said credit balance means an unused amount, wherein said unused amount is said difference between said usable amount and said cost amount,
wherein said method comprises steps of:
a) providing said memory with a first memory area and a second memory area, and
b) in a first transaction, transferring said usable amount from said credit balance means to said first memory area of said memory;
c) in a second transaction transferring said unused amount from said first memory area to said credit balance; and
d) in a third transaction transferring said cost amount from said first memory area to said second memory area.

In accordance with a second aspect of the invention, there is provided apparatus for payment for services and/or goods, comprising
a credit balance means (credit balance carrier) provided with an amount value; and
a data terminal device for, prior to a purchase of a service and/or goods:
reading a usable amount from said credit balance means;
determining a running cost amount for said service and/or goods during said purchase; and
storing back in said credit balance means an unused amount which is the difference between said usable amount and said cost amount,
wherein said apparatus comprises:
a security module with a memory, connected to said data terminal device via a communications channel, wherein:
said memory comprises a first memory area and a second memory area;
and said apparatus is operable:
to transfer said usable amount from said credit balance means to said first memory area;
to store said unused amount from said first memory area back to said credit balance means; and
to transfer said cost amount from said first memory area to said second memory area.

BRIEF DESCRIPTION OF THE DRAWINGS

FIG. 3 is a flowchart of the steps in a payment.

DESCRIPTION OF PREFERRED EMBODIMENTS

Figure 1:
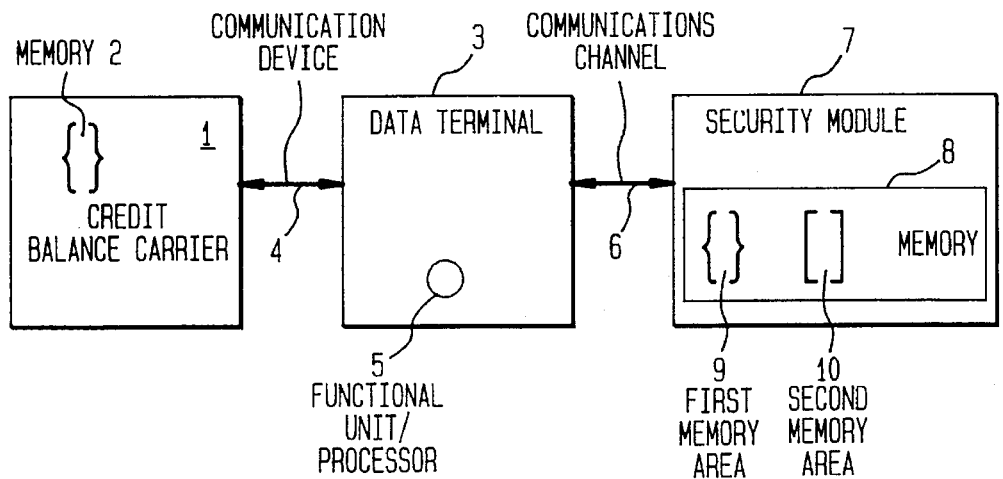
FIG. 1 is a schematic diagram of an apparatus for payment for services and/or goods.

In FIG. 1, a credit balance means (credit balance carrier) 1 is provided with a memory 2. A data terminal device (terminal) 3 is provided with a communication device 4 via which data of the credit balance means 1 are readable from the data terminal device 3 and data of the credit balance means 1 are changeable. The data terminal device 3 is further provided with an activity 5 (functional unit 5) and is connected to a security module 7 via a communications channel 6. The security module is provided with a memory means 8 having a first memory area 9 and a second memory area 10.

The data terminal device 3 is at least a part of, or is connected to an apparatus for procuring a service and/or goods; for example, the data terminal device 3 can be a payphone, a facsimile unit or a petrol pump.

The activity 5 (functional unit 5) is an electronic circuit and/or a programmed processor. If required, the functional unit 5 can be formed by a plurality of programmed processors.

The credit balance means 1 is, if required, provided with processors and/or further functional units and in its memory is provided with a pre-paid amount available for payment of services and/or goods instead of cash.

If required, the amount available can, for example, correspond to a number of charge impulses or a number of liters of fuel.

The credit balance means 1 is for example a so-called chip card (integrated circuit card) as standardised for instance in ISO/IEC 7816.

The memory area 9 is advantageously a write/read memory, the content of which is not lost in case of miscellaneous supply failure.

If required the security module 7 is provided with processors and/or further functional units. In a variant of the apparatus the security module 7 is a chip card.

If required, the security module 7 can be formed together with the communications channel 6 and the data terminal device 3 in a common assembly.

Figure 2:
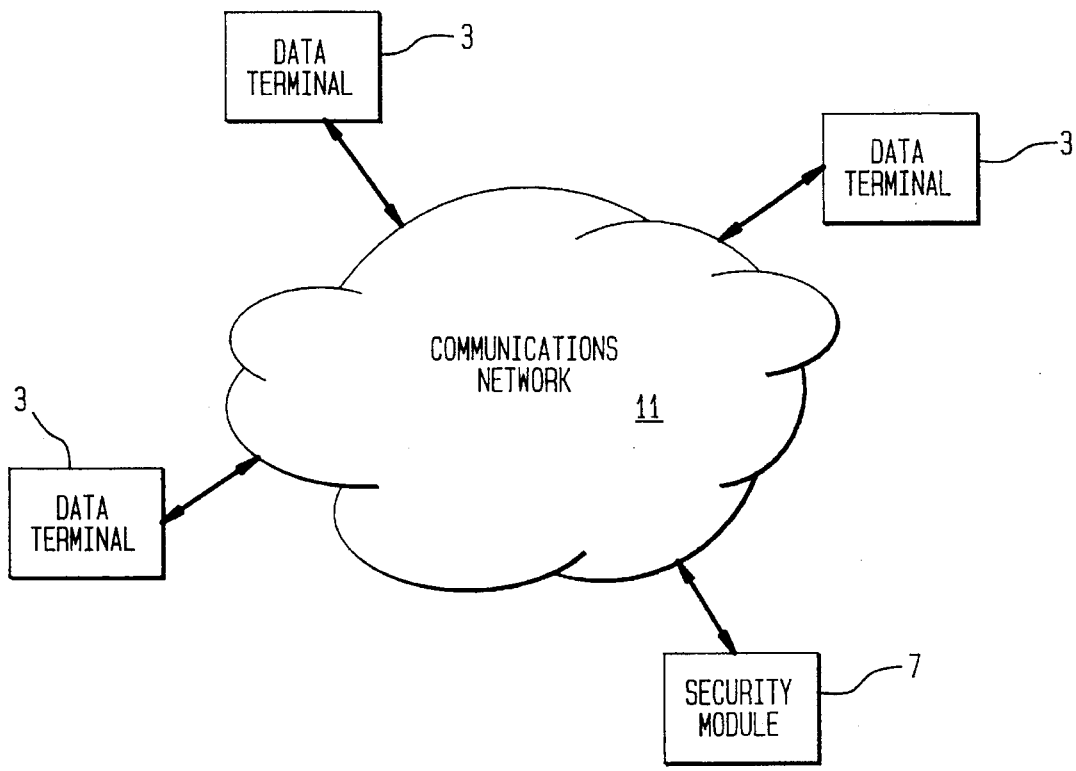
FIG. 2 is a schematic representation of plurality of data terminal devices which are connected to a security module via a communications network.

FIG. 2 shows three data terminal devices 3 connected to a security module 7 by means of a communications network 11. There is essentially no limit to the maximum number of data terminal devices 3 in the communications network 11. The communications network 11 forms the communications channel 6 (FIG. 1) between each data terminal device 3 and the security module 7.

The communications network 11 is essentially any data network, in which the communications channel 6 is available.

In an advantageous manner, the communications network 11 is a telephone network or a data network, in which an adding on/removal of the communications channel 6 from the data terminal device 3 can be performed in a known way.

An apparatus with the data terminal device 3 (FIG. 1), the credit balance means 1, the communications channel 6 and the security module 7 makes possible reliable payment for services and/or goods.

The apparatus is provided with an inhibiting and an enabling means, which only permit transactions to the credit balance means from the first memory area 9 and thus do not permit transactions to the credit balance means from the second memory area 10. Illustratively, the inhibiting and enabling means are part of the security module 7.

In the following an advantageous method for reliable payment for services and/or goods will be described in principle, whereby it is assumed that the first memory area 9 is empty.

In a first transaction prior to purchase of a service/goods an amount M available for the service/goods is transferred from the credit balance means 1 (FIG. 1) to the first memory area 9 of the memory means 8. During the purchase of the service a running cost amount K for the service/goods is determined in a known way. In a second transaction an unused amount Mv is transferred to the credit balance means 1 from the first memory area 9, whereby the unused amount Mv is the difference between the usable amount M and the cost amount K. Illustratively, the activity 5 (functional unit 5) of the data terminal device 3 computes the unused amount Mv. This second transaction results for example after the purchase of the service/goods or when the cost amount K arrives at a predetermined difference to the usable amount M. In a third transaction the difference M–Mv between the usable amount M and the unused amount Mv which corresponds to the cost amount K is transferred from the first memory area 9 to the second memory area 10.

By means of the second and third transactions the usable amount M is thus again removed from the first memory area 9. The content of the first memory area 9 is therefore emptied again; further amounts could no longer be transferred from the first memory area 9 to the credit balance means 1.

In a first variant of the method partial amounts of the amount M—which each correspond for example to a single charge impulse—are transferred in the security module 7 from the first memory area 9 to the second memory area 10, whereby the partial amounts are transferred via the communications channel 6 and the data terminal device 3 or, in a further variant of the method, directly into the security module 7.

Advantageously identification markers are used during transactions. An identifier is advantageously provided with at least one key. If required different keys can be inserted. Different transactions can, if required, be performed according to different algorithms.

In FIG. 3 actions to be carried out, which can be advantageously performed by a reliable payment, are sequentially represented between a beginning 12 and an end 13. Substantial flows of information for an action, via the communications channel 6 (FIG. 1) to or from the security module 7, either via the communications device 4 (FIG. 1) to or from the credit balance means 1, are marked in by means of an arrow between the action and the security module 7 or credit balance means 1, each of which is represented by a dotted line. Advantageously the actions are initiated by the activity 5 (functional unit 5) (FIG. 1).

Information flows can, according to their nature, be the actual data flow or the event flow and they are for example effected in a known manner by calling up a sub-program or as a parameter of a sub-program by means of sending a data message or a signal or also by initiating a process.

The time taken by the actions passes in the direction of a time axis 14.

In a first action 15 a first unique number $n_1$ is generated and made known to the security module 7 and the data terminal device 3, whereby the unique number $n_1$ is advantageously generated by the security module 7 itself. If required however the unique number $n_1$ is generated in the data terminal device 3. Advantageously a first information flow 16 is a call for the generation of a unique number $n_1$ and a second information flow 17 is provided with the unique number $n_1$.

The unique number $n_1$, which is advantageously a random number or a pseudo-random number, prevents miscellaneous data streams picked up from the communications device 4 or in the communications channel 6 from being duplicated with intent to defraud.

In a second action 18 a third information flow 19 causes a first reduction operation $D_G$ by means of which the amount of the credit balance means 1 is lessened by the amount M usable for the services/goods. The third information flow 19 is advantageously provided with a unique number $n_1$ and further, if required also with a minimal value which must show the amount M for demanding services/goods. In the action 18, following the completion of the reduction operation $D_G$ a fourth information flow 20 is received via the data terminal device 3 (FIG. 1). The fourth information flow 20 advantageously contains the amount M and a first identification marker $S_1$. Moreover, the fourth information flow 20 is provided, if required, with additional data such as, for example, the available amount of the credit balance means 1. The identification marker $S_1$ is advantageously formed by a transformation of the amount M, the unique number $n_1$ and a first key $K_1$.

In a third action 21 a fifth information flow 22 causes a first increasing operation $I_S$ by means of which the usable amount M is stored in the first memory area 9. The fifth information flow 22 is provided with the usable amount M and advantageously with the first identifier $S_1$. In the first increasing operation $I_S$ the usable amount M is advantageously only stored after successful checking of the first identification marker $S_1$. The termination of the increasing operation $I_S$ is by the security module 7 while the third action 21 is confirmed by a sixth information flow 23 from the data terminal device 3 (FIG. 1).

In a fourth action 24, which is performed during the purchase of the service/goods, a running cost amount K for the service/goods is determined. Moreover, in the fourth action 24 it is ensured that the cost amount K does not exceed the usable amount M.

If the service procured is, for example, a telephone service, determination of the running cost amount K can be continuously carried out in a known manner by the addition of charge impulses.

If required in the fourth action 24 user instructions can be transmitted via dialogue means of the data terminal device 3.

In addition the fourth action 24 permits discontinuation of the purchase of the service/goods, if the cost amount K comes to a determined differential—which can also be nil—of the usable amount M.

In a fifth action 25 a second unique number $n_2$ is generated and made known to the credit balance means 1 and the data terminal device 3 (FIG. 1), whereby the second unique number $n_2$ is advantageously generated by the credit balance means itself. If required the second unique number $n_2$ is however generated in the data terminal device 3. Advantageously a seventh information flow 26 is a call for the generation of the unique number $n_2$ and an eighth information flow 27 is provided with the unique number $n_2$.

The unique number $n_2$, which is advantageously a random number or a pseudo-random number, prevents miscellaneous data streams picked up from the communications device 4 or in the communications channel 6 from being duplicated with intent to defraud.

In a sixth action 28, a ninth information flow 29 causes a second reduction operation $D_{S1}$, by means of which the amount M stored in the first memory area 9 is lessened by the unused amount Mv. The ninth information flow 29 is advantageously provided with the second unique number $n_2$ and the unused amount Mv. In the sixth action 28 after completion of the second reduction operation $D_{S1}$ a tenth information flow 30 is received by the data terminal device 3 (FIG. 1). In the tenth information flow 30 the amount Mv and a second identifier $S_2$ are advantageously contained. The second identifier $S_2$ is advantageously formed by transformation of the amount Mv, the second unique number $n_2$ and a second key $K_2$.

In a seventh action 31 an eleventh information flow 32 causes a second increasing operation $I_G$ by means of which the unused amount Mv is stored back in the credit balance means 1. The eleventh information flow 32 is advantageously provided with the unused amount Mv and the second identification marker $S_2$. In the second increasing operation $I_G$ the unused amount Mv is advantageously only stored after successful checking of the second identification marker $S_2$. The termination of the increasing operation $I_G$ is by the credit balance means 1, while the seventh action 31 is confirmed by a twelfth information flow 33 of the data terminal device (3) (FIG. 1).

Following the seventh action 31 the credit balance means 1 can if required be withdrawn from the data terminal device 3.

In an eighth action 34 a third unique number $n_3$ is generated, and made known to the security module 7 and to the data terminal device 3 (FIG. 1). A thirteenth information flow 35 is advantageously a call for the generation of the third unique number $n_3$ and a fourteenth information flow 36 is provided with the third unique number $n_3$.

The unique number $n_3$, which is advantageously a random number or a pseudo-random number, prevents miscellaneous data streams picked up from the communications device 4 or in the communications channel 6 from being duplicated with intent to defraud.

In a ninth action 37 a fifteenth information flow 38 causes a third reduction operation $D_{S2}$, by means of which the content of the first memory area 9 is lessened by the difference M–Mv between the usable amount M and the unused amount Mv. The difference M–Mv corresponds to the cost amount K of the purchased service/goods. The fifteenth information flow 38 is advantageously provided with the third unique number $n_3$ and the difference M–Mv. In the ninth action 37, after completion of the third reduction operation $D_{S2}$ a sixteenth information flow 39 is received from the data terminal device 3 (FIG. 1). In the sixteenth information flow 39 the difference M–Mv and a third identification marker $S_3$ are advantageously contained. The third identification marker $S_3$ is advantageously formed by a transformation of the difference M–Mv, the third unique number $n_3$ and the first key $K_1$.

In a tenth action 40 a seventeenth information flow causes a third increasing operation $I_{S2}$, by means of which the difference M–Mv is stored in the second memory area 10. The seventeenth information flow 41 is provided with the difference M–Mv, the third unique number $n_3$ and advantageously the third identifier $S_3$. In the third increasing operation $I_{S2}$, the difference M–Mv is advantageously only stored after successful checking of the third identification marker $S_3$. According to requirements, in the third increasing operation $I_{S2}$ the difference M–Mv is added to a value already stored in the second memory area 10 and stored, or stored separately as additional data. The completion of the third increasing operation $I_{S2}$ is by the security module 7, while the tenth action 40 is confirmed by an eighteenth information flow 42 of the data terminal device 3 (FIG. 1).

In both variants of the method the partial amounts of the usable amount M are advantageously-transferred, in the fourth action 24, from the first memory area 9 to the second memory area 10, whereby in the first variant the eighth action 34, the ninth action 37 and the tenth action 40 are advantageously each performed.

If, after the third action 21 until the beginning of the sixth action 28, the communications channel 6 is not used, and if the communications channel 6 is for example a telephone channel, the logical connection between the data terminal device 3 and the security module 7 is advantageously disconnectable during this time.

The three identification markers $S_1$, $S_2$ and $S_3$ are advantageously cryptographic identification markers which are coded for security reasons to deny unauthorized access.

By assembly of the three identifiers $S_1$, $S_2$ and $S_3$ and further also by the type of the two keys $K_1$ and $K_2$ the reliability attainable can be matched to the desired demands.

By means of the method described, in which principally three transformations can be performed, the cost amount K of a service/goods can be reliably deducted and also stored in the security module 7.

Only amounts previously deducted in the valid credit balance means 1 can be stored in the security module.

The cost amount K of the service/goods does not have to known beforehand; the method allows a deduction of amounts in rapid succession, as found for example in the case of charge impulses in payphones or in facsimile units or also in a price meter in a hire car or when re-fuelling.

The method also permits reliable movement of the cost amount K from a credit balance means 1 to a security module 7 in an open system.

In the method no lasting logical connection between the credit balance means 1 and the security module 7 is necessary. By means of the security module 7 a plurality of credit balance means 1, can be used for example in a time-sharing operation.

The method can be extended with little effort. If the cost amount K is stored as a unit of data at least together with an identifier of the owner of the data terminal device 3 and/or an identifier of the supplier of the service/goods and/or an identifier of the place of sale or the issuer of the credit balance means 1, if required for example the services and/or goods of different institutions and/or different services and/or goods of an institution can be calculated and/or statistically acquired.

As a result of the opportunity for calculation moreover a single credit balance means 1 can be used for different services and/or goods, even when these are offered by different institutions.

Although illustrative embodiments of the invention have been described in detail herein with reference to the accompanying drawings, it is to be understood that the invention is not limited to those precise embodiments, and that various changes and modifications can be effected therein by one skilled in the art without departing from the spirit and scope of the invention as defined by the appended claims.

We claim:

1. A method for payment for services and/goods of a type, using a credit balance means that stores an amount M thereon, comprising steps of:

prior to a purchase of a service and/or goods:
reading with a data terminal device said amount M from said credit balance means; and
writing with said data terminal device said amount M into a memory of a security module; and during said purchase:
determining with said data terminal device a running cost amount K for said service and/or goods; and
storing back with said data terminal device into said credit balance means an amount Mv, wherein said amount Mv is a difference between said amount M and said cost amount K, wherein said method comprises steps of:

a) providing said memory with a first memory area and a second memory area, and b) in a first transaction prior to said purchase, said data terminal device subtracting said amount M from said credit balance means, and adding said amount M to said first memory area;

c) in a second transaction during said purchase, said data terminal device subtracting said amount Mv from said first memory area, and adding said amount Mv to said credit balance means; and d) in a third transaction, said data terminal device transferring said cost amount K from said first memory area to said second memory area.

2. A method for payment for services and/goods of a type, using a credit balance means that stores an amount M thereon, comprising steps of:

prior to a purchase of a service and/or goods:
reading with a data terminal device said amount M from said credit balance means; and
writing with said data terminal device said amount M into a memory of a security module; and during said purchase:
determining with said data terminal device a running cost amount K for said service and/or goods; and
storing back with said data terminal device into said credit balance means an amount Mv, wherein said amount Mv is a difference between said amount M and said cost amount K, wherein said method comprises steps of:

a) providing said memory with a first memory area and a second memory area, and b) in a first transaction prior to said purchase, said data terminal device subtracting said amount M from said credit balance means, and adding said amount M to said first memory area;

c) in a second transaction during said purchase, said data terminal device subtracting said amount Mv from said first memory area, and adding said amount Mv to said credit balance means; and d) in a third transaction, said data terminal device transferring said cost amount K from said first memory area to said second memory area, wherein transactions to said credit balance means from said first memory area are permitted and/or transactions to said credit balance means from said second memory area are prevented by inhibiting means and/or enabling means.

3. A method according to claim 2 wherein identification markers are used during said transactions.

4. A method according to claim 2 wherein said third transaction is divided into at least three partial transactions, whereby in said partial transactions a partial amount of said cost amount K is transferred from said first memory area to said second memory area.

5. A method according to claim 2 wherein after said third transaction the contents of said first memory area are emptied.

6. Apparatus for payment for services and/or goods, comprising a credit balance means which stores an amount M; and a data terminal device for:
prior to a purchase, reading said amount M from said credit balance means;
during said purchase, determining a running cost amount K for said service and/or goods during said purchase; and
during said purchase, storing back in said credit balance means an amount Mv which is the difference between said amount M and said cost amount K, wherein said apparatus comprises:

a security module with a memory, connected to said data terminal device via a communications channel, wherein:

said memory comprises a first memory area and a second memory area;

and said data terminal device is operable:

in a first transaction prior to said purchase, to subtract said amount M from said credit balance means, and to add said amount M to said first memory area;

in a second transaction during said purchase, to subtract said amount Mv from said first memory area, and to add said amount Mv to said credit balance means; and in a third transaction, to transfer said cost amount K from said first memory area to said second memory area.

7. Apparatus for payment for services and/or goods, comprising a credit balance means provided with an amount M; and
a data terminal device for:
  prior to a purchase, reading said amount M from said credit balance means;
  during said purchase, determining a running cost amount K for said service and/or goods during said purchase; and
  during said purchase, storing back in said credit balance means an amount Mv which is the difference between said amount M and said cost amount K,
wherein said apparatus comprises:
  a security module with a memory, connected to said data terminal device via a communications channel, wherein:
    said memory comprises a first memory area and a second memory area; and said data terminal device is operable:
    in a first transaction prior to said purchase, to subtract said amount M from said credit balance means, and to add said amount M to said first memory area;
    in a second transaction during said purchase, to subtract said amount Mv from said first memory area, and to add said amount Mv to said credit balance means; and
    to transfer said cost amount K from said first memory area to said second memory area,
wherein an inhibiting means and/or enabling means is provided for permitting a transaction to said credit balance means from said first memory area and for preventing a transaction to said credit balance means from said second memory area.

8. A method according to claim 7 wherein said security module is at a remote location in relation to said data terminal device and is capable of being time shared among a plurality of said data terminal devices.

9. A method of paying for good/services having a cost K using a pre-paid credit balance card that stores an amount M comprising the steps of:

in a first transaction prior to a purchase, using a processor of a data terminal, decreasing the amount stored on the credit card by said amount M, and increasing a value stored in a first memory area of a security module, connected to the data terminal via a communications channel, by said amount M, in a second transaction during said purchase, using said processor, decreasing said amount M stored in said first memory area by an amount Mv, where Mv equals said amount M minus said cost K, and increasing a value stored on the credit balance card by said amount Mv and, in a third transaction, using said processor, transferring said amount M−Mv=K, from said first memory area to said second memory area.

* * * * *